United States Patent
Takahara

(10) Patent No.: US 7,903,983 B2
(45) Date of Patent: Mar. 8, 2011

(54) OPTICAL RECEIVER AND CONTROL METHOD FOR OPTICAL RECEIVER

(75) Inventor: Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 575 days.

(21) Appl. No.: 12/056,621

(22) Filed: Mar. 27, 2008

(65) Prior Publication Data
US 2008/0240737 A1 Oct. 2, 2008

(30) Foreign Application Priority Data

Mar. 28, 2007 (JP) .................................. 2007-085789

(51) Int. Cl.
*H04B 10/06* (2006.01)
(52) U.S. Cl. ........................................ 398/202; 398/155
(58) Field of Classification Search .................. 398/202, 398/155
See application file for complete search history.

(56) References Cited

U.S. PATENT DOCUMENTS

| 7,689,133 B2 * | 3/2010 | Katagiri et al. ............... 398/204 |
| 7,805,085 B2 * | 9/2010 | Noheji .......................... 398/209 |
| 2006/0193640 A1 | 8/2006 | Katagiri et al. ............... 398/188 |

FOREIGN PATENT DOCUMENTS

JP 2006-270909 10/2006

* cited by examiner

*Primary Examiner* — Leslie Pascal
(74) *Attorney, Agent, or Firm* — Staas & Halsey LLP

(57) ABSTRACT

An optical receiver converting an optical signal modulated by differential phase shift keying to electrical first and second data signals; generating a clock signal from the first data signal; demultiplexing the first data signal into two signals; latching the two signals using the clock signal; delaying the clock signal by a certain amount; latching the two signals using the delayed clock signal; demultiplexing the second data signal into two additional signals; generating an inverted clock signal by inverting the clock signal; latching the two additional signals using the inverted clock signal or the clock signal; and further latching the two additional signals using the delayed clock signal.

10 Claims, 5 Drawing Sheets

OPTICAL RECEIVER AND CONTROL METHOD FOR OPTICAL RECEIVER

TECHNICAL FIELD

The present invention relates to an optical receiver and a control method for the optical receiver which receives an optical signal modulated by differential phase shift keying. In particular, the present invention relates to an optical receiver and a control method for the optical receiver capable of adjustment of the phase difference between two input signals, for example DQPSK (Differential Quadrature Phase Shift Keying), using a simple structure.

DESCRIPTION OF THE RELATED ART

In recent years, optical transmission systems have been proposed which use the DQPSK modulation format as one differential phase shift keying technology for further widening the bandwidth of an optical communication network. Since 2 bits of information are transmitted by 1 symbol according to this format, a transmission rate of 40 Gb/s can be realized using a modulation rate of 20 Gbaud/s. According to this type of optical transmission system, an optical signal transmission device modulates the optical carrier by the DQPSK modulation format and transmits an optical signal; and an optical receiver extracts data by demodulation of the received optical signal,

SUMMARY

According to an aspect of an embodiment, an optical receiver receives an optical signal modulated by differential phase shift keying. The optical receiver includes an optical front end receiving the optical signal modulated by differential phase shift keying and converting the received optical signal to electrical first and second data signals corresponding to differential phase shift keying signals including an in-phase and a quadrature phase; a clock regenerator regenerating a clock signal from the first data signal; a first demultiplexer demultiplexing the first data signal into two signals; a first decision circuit outputting the two signals demultiplexed by the first demultiplexer using the clock signal; a delay member outputting a delayed clock signal produced by delaying the clock signal by a certain amount; a second decision circuit outputting the two signals demultiplexed by the first demultiplexer using the delayed clock signal; a second demultiplexer demultiplexing the second data signal into two signals; an inverter generating an inverted clock signal by inverting the clock signal and outputting either the inverted clock signal or the clock signal; a third decision circuit outputting the two signals demultiplexed by the second demultiplexer using the inverted clock signal or the clock signal, respectively, and a fourth decision circuit respectively outputting the two signals output by the third decision circuit using the delayed clock signal.

The above aspect of an embodiment is only intended as an example. All aspects of all embodiments are not intended to be limited to including all the features in this example.

DETAILED DESCRIPTION OF THE PREFERRED EMBODIMENTS

Preferred embodiments of the optical receiver and control method of the optical receiver according to the present embodiments are explained below in detail with reference to the drawings attached below.

Firstly, even if a phase difference occurs between two input data signals having a transmission rate, for example, of 20 Gb/s, the optical receiver of the present embodiment, using a simple structure, is capable of adjustment of the phase difference up to a maximum 100 ps (2 time slots). The optical receiver having this type of function is explained below.

Figure 1:
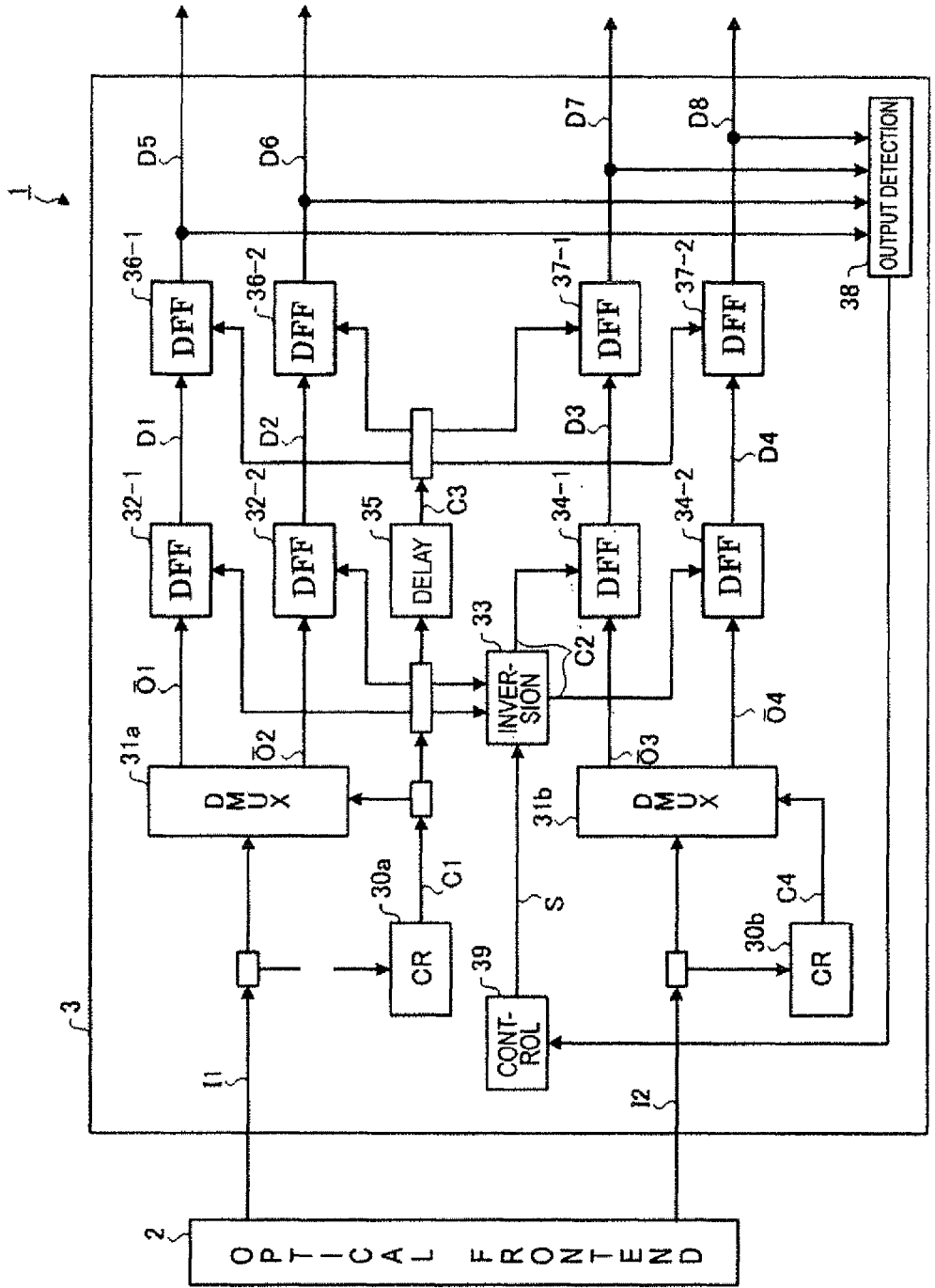
FIG. 1 is a drawing illustrating an example of the structure of the optical receiver.

The structure of the optical receiver of the present embodiment will be explained. FIG. 1 is a drawing illustrates an example of a structure of the optical receiver. As shown in this figure, an optical receiver 1 has an optical front end 2 and a signal receiver 3. The optical front end 2 is a known circuit which extracts from the received optical signal two phase-modulated components which are mutually orthogonal, converts the optical signals included in these two phase-modulated components into electrical signals by optical-electrical conversion and current-voltage conversion, amplifies these two electrical signals, and outputs a first data signal and a second data signal. The optical front end 2, for example, has a structure using an optical splitter, a delay interferometer, a photodiode, a transimpedence amplifier (TIA), and a limiting amplifier (LIA). However, the optical front end 2 is not limited to this structure. For example, the limiting amplifier may be omitted from the above-mentioned structure, and an automatic gain controller (AGC) may be used instead of the limiting amplifier. An electrical dispersion compensator (EDC) or an equalization filter can also be further used in the above-mentioned structure.

The signal receiver 3 has clock recovery circuits 30a and 30b; demultiplexer circuits 31a and 31b; decision circuits 32-1, 32-2, 34-1, 34-2, 36-1, 36-2, 37-1, and 37-2; an inversion circuit 33; a delay circuit 35; an output detection circuit 38; and a control circuit 39.

The clock recovery circuit 30a regenerates a clock signal C1 from a first data signal I1 output from the optical front end 2. The clock recovery circuit 30b regenerates a clock signal C4 from a second data signal I2 output from the optical front end 2. Here the transmission rates of the first data signal I1 and the second data signal I2 are set to 20 Gb/s.

The demultiplexer circuit 31a demultiplexes the first data signal I1 output by the optical front end 2 into two signals (O1 and O2) using the clock signal C1. The demultiplexer circuit 31b demultiplexes the first data signal I2 output by the optical front end 2 into two signals (O3 and O4) using the clock signal C2. Specifically, the demultiplexer circuit 31a demultiplexes the first data signal I1 of 20 Gb/s into 2 signals O1 and O2 at the rising edge timing and falling edge timing of the 10 Gb/s clock signal. The demultiplexer circuit 31b demultiplexes the second data signal I2 of 20 Gb/s into 2 signals O3 and O4 at the rising edge timing and falling edge timing of the 10 GHz clock signal. The 10 GHz clock signal is generated using the clock signal C1 or the clock signal C4.

The decision circuits 32-1, 32-2, 34-1, 34-2, 36-1, 36-2, 37-1, and 37-2, for example, have structures which use a D Flip-Flop (DFF) and latch the input signal using the clock signal and the like. These decision circuits comprise two stages each at the respective back stage side of each demultiplexer circuit 31a and 31b. Specifically, the decision circuits 32-1 and 32-2 are disposed at the first stage of the demultiplexer circuit 31a side; and the decision circuits 36-1 and 36-2 are disposed at the second stage. Meanwhile, the decision circuits 34-1 and 34-2 are disposed at the 1st stage of the demultiplexer circuit 31b side, and the decision circuits 37-1 and 37-2 are disposed at the 2nd stage.

The inversion circuit 33 is an inversion circuit of the clock phase. When the inversion function is set to ON, the phase of the clock signal C1 is inverted, and an inverted clock signal C2 is output. When the inversion function is turned OFF, the clock signal C1 is output with the phase thereof unchanged. The ON/OFF setting of the inversion function is determined by a control signal S from the below-described control circuit 39. For the inversion circuit 33 shown in FIG. 1, as a matter of convenience in order to show the inversion circuit 33 in the case of the inversion function turned ON, the inverse clock signal C2 is output from the inversion circuit 33. However, when the inversion function is set OFF, the clock signal C1 becomes output from the inversion circuit 33.

The delay circuit 35 imparts a delay equivalent to $\pi/4$ with regard to the clock signal C1 and generates a delayed clock signal C3. The amount of delay is not restricted to $\pi/4$. Delay by a certain delay amount is permissible in consideration of accuracy of design of the circuits and the like.

The control circuit 39 receives signals D5, D6, D7, and D8 outputted from the decision circuits 36-1, 36-2, 37-1, and 37-2 and detected by the output detection circuit 38, and according to the output states of these signals, generates a control signal S for the ON/OFF setting of the inversion function of the inversion circuit 33.

The control signal S generated by the control circuit 39 is a signal generated when the optical receiver 1 is manufactured or begins operation, and this signal is transmitted to the inversion circuit 33. Specifically, after the optical receiver 1 is assembled, for example, a below-described test pattern input signal is input to the optical receiver 1, and according to the output results thereof, the control circuit 39 generates the control signal S for setting ON or OFF the inversion function of the inversion circuit 33. Details of the generation of the control signal S will be described later.

Signal flow will be explained below in the case of reception of an optical signal by the optical receiver 1 having this type of structure.

Firstly, the optical front end 2 outputs to the signal receiver 3 the first data signal I1 and the second data signal I2 obtained by conversion of the received optical signal into electrical signals and the like.

Thereafter, the demultiplexer circuit 31a of the signal receiver 3 uses the clock signal C1 generated by the clock recovery circuit 30a to demultiplex the first data signal I1 into two signals (O1 and O2) and outputs these two demultiplexed signals O1 and O2 to the decision circuit 32-1 and decision circuit 32-2, respectively. Meanwhile, the demultiplexer circuit 31b uses the clock signal C4 generated by the clock recovery circuit 30b to demultiplex the second data signal I2 into two signals (O3 and O4) and outputs these two demultiplexed signals O3 and O4 to the decision circuit 34-1 and decision circuit 34-2, respectively.

Thereafter, the decision circuit 32-1 latches the input signal O1 using the clock signal C1 output from the clock recovery circuit 30a and outputs a signal D1 to the decision circuit 36-1; and the decision circuit 32-2 latches the input signal O2 using the clock signal C1 output from the clock recovery circuit 30a and outputs a signal D2 to the decision circuit 36-2. Meanwhile, the decision circuit 34-1 latches the input signal O3 using the inverse clock signal C2 or C1 output from the inversion circuit 33 and outputs a signal D3 to the decision circuit 37-1; and the decision circuit 34-2 latches the input signal O4 using the inverse clock signal C2 or C1 output from the inversion circuit 33 and outputs a signal D4 to the decision circuit 37-2

Figure 2:
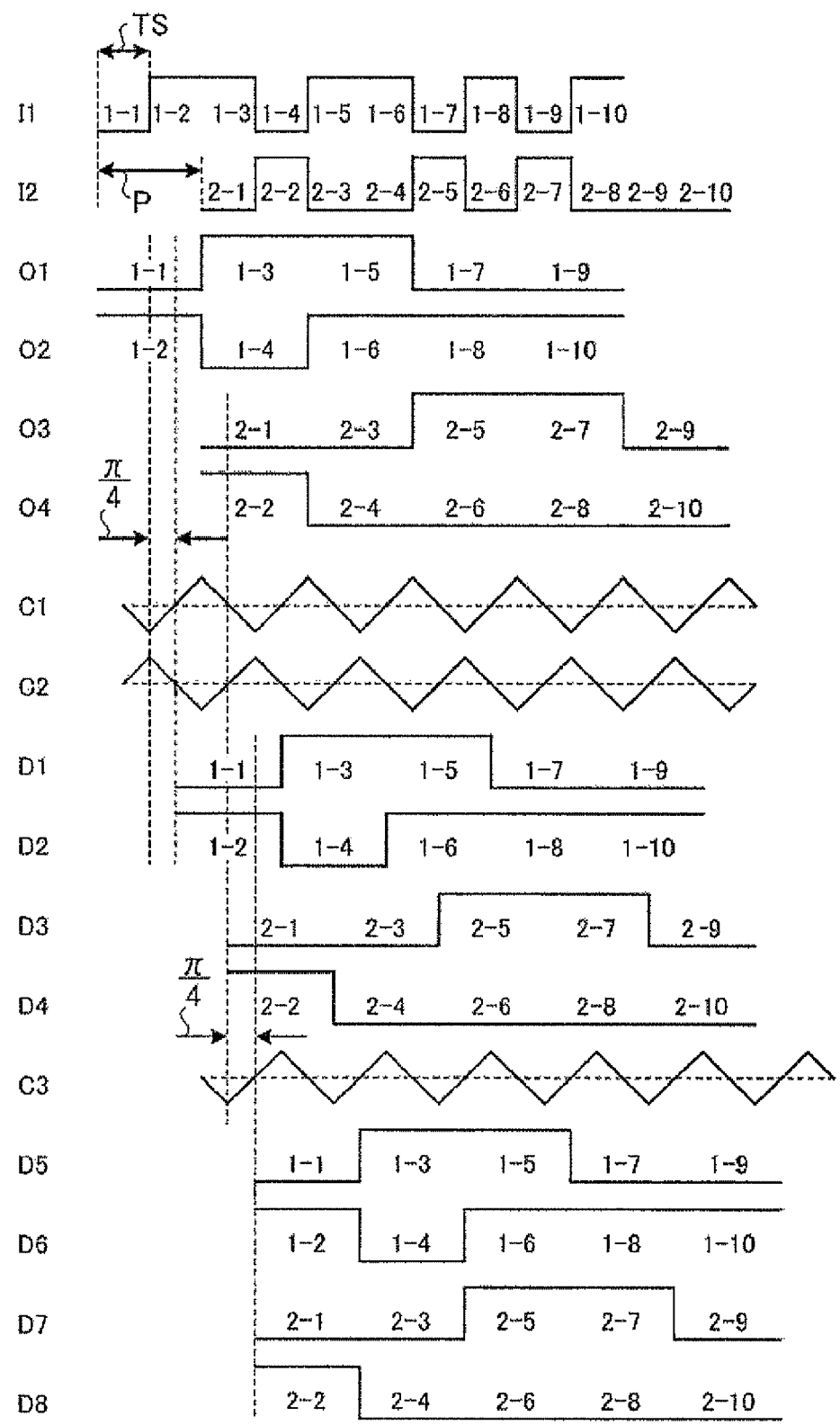
FIG. 2 is a drawing illustrating an example of a timing chart of the optical receiver.

The decision circuit 36-1 latches the input signal D1 using the delayed clock signal C3 output from the delay circuit 35 and outputs a signal D5 to outside of the signal receiver 3; and the decision circuit 36-2 latches the input signal D2 using the delayed clock signal C3 output from the delay circuit 35 and outputs a signal D6 to the exterior. Meanwhile, the decision circuit 37-1 latches the input signal D3 using the delayed clock signal C3 output from the delay circuit 35 and outputs a signal D7 to the exterior; and the decision circuit 37-2 latches the input signal D4 using the delayed clock signal C3 output from the delay circuit 35 and outputs a signal D8 to the exterior While referring to FIG. 2, operation will be explained for the case of adjustment of a phase difference equivalent to 2 time slots arising between two input data signals using the optical receiver 1 according to the present embodiment. FIG. 2 is a drawing illustrating a timing chart for the optical receiver showing the case of NRZ code for the input data signal. The time slot TS, for example, becomes 50 ps in the case of a transmission rate of 20 GHz. The phase difference P between the two input data signals (first data signal I1 and second data signal I2) is equivalent to 2 time slots (100 ps). The inversion function of the inversion circuit 33 is also set to ON. That is to say, the inverted clock signal C2 is output from the inversion circuit 33.

Firstly, the first data signal I1 is demultiplexed using the 10 GHz clock signal to form the signal O1 and the signal O2, and the second data signal I2 is demultiplexed using the 10 GHz clock signal to form the signal O3 and the signal O4. At this time, 100 ps phase differences still exist between the signal O1 and the signal O2 versus the signal O3 and the signal O4.

Thereafter, the signal O1 and the signal O2 are latched at the rising edge timing of the clock signal C1, and the signal D1 and the signal D2 are output. At this time, the clock signal C1 is delayed by $\pi/4$ relative to the optimum decision phase of the signal O1.

Meanwhile, the signal O3 and the signal O4 are latched at the rising edge timing of the inverted clock signal C2, and the signal D3 and the signal D4 are output. At this time, the phase difference between the signal D1 and the signal D2 versus the signal D3 and the signal D4 is adjusted to 50 ps, which is equivalent to 1 time slot. That is to say, 50 ps of the phase difference becomes canceled at this time.

Thereafter, the signal D1 and the signal D2 are latched at the rising edge timing of the delayed clock signal C3, and the signal D5 and the signal D6 are output. The delayed clock signal C3 here is delayed by $\pi/4$ more than the clock signal C1.

The signal D3 and the signal D4 are latched at the rising edge timing of the delayed clock signal C3, and the signal D7 and the signal D8 are output. The phase difference between the signal D5 and the signal D6 versus the signal D7 and the signal D8 is canceled at this time. That is to say, according to the optical receiver 1 of the present embodiment, a phase difference of 100 ps equivalent to 2 time slots arising between two input data signals becomes canceled.

In this manner, the optical receiver 1 of the present embodiment is characterized in that a phase difference is adjusted by the first stage decision circuits 32 and 34, resulting in 50 ps, which is equivalent to 1 time slot; and phase difference is adjusted by the second stage decision circuits 36 and 37, resulting in 0 ps. That is to say, reduction of the phase difference at the time of input by just 0-1 time slots becomes possible using the first stage decision circuits 32 and 34, and reduction of the phase difference at the time of input by a further 1 time slot becomes possible using the second stage decision circuits 36 and 37. Therefore, cancellation of the phase difference becomes possible when the phase difference between two input signals is within the range of 50 ps to 100 ps (1 time slot-2 time slots). Moreover, when the phase difference between two input signals exceeds 100 ps, cancellation is possible of a maximum of 100 ps of the phase difference.

Meanwhile, when the phase difference between two input data signals is less than 50 ps (1 time slot) and when the phase is adjusted in the same manner, the phase difference instead increases, and a resultant mismatch is thought to occur between the output signals. In this case, due to setting the signal output from the inversion circuit 33 to the clock signal C1, adjustment is possible such that the phase difference between the output signals becomes 0 ps. That is to say, by the use of the first stage decision circuits 32 and 34 and the second stage decision circuits 36 and 37, it becomes possible to reduce the phase difference at the time of input by just 0-1 time slots. The mismatch between the output signals can be prevented by this means.

Incidentally, in the case of an ideal circuit structure, whether to use the clock signal C1 or to use the inverted clock signal C2 output from the inversion circuit 33 can be determined based on whether or not the phase difference is greater than or equal to 50 ps (1 time slot). However, since errors and the like are included in the various types of elements comprising the circuit, indiscriminate determination based entirely on whether or not the phase difference is greater than or equal to 50 ps is not desirable.

Thus according to the optical receiver 1 of the present embodiment, a data signal of a test pattern is input, and based on the resultant output, determination is made whether to use the clock signal C1 or to use the inverted clock signal C2 output from the inversion circuit 33. This is explained specifically while referring to FIG. 3-FIG. 5.

Figure 3:
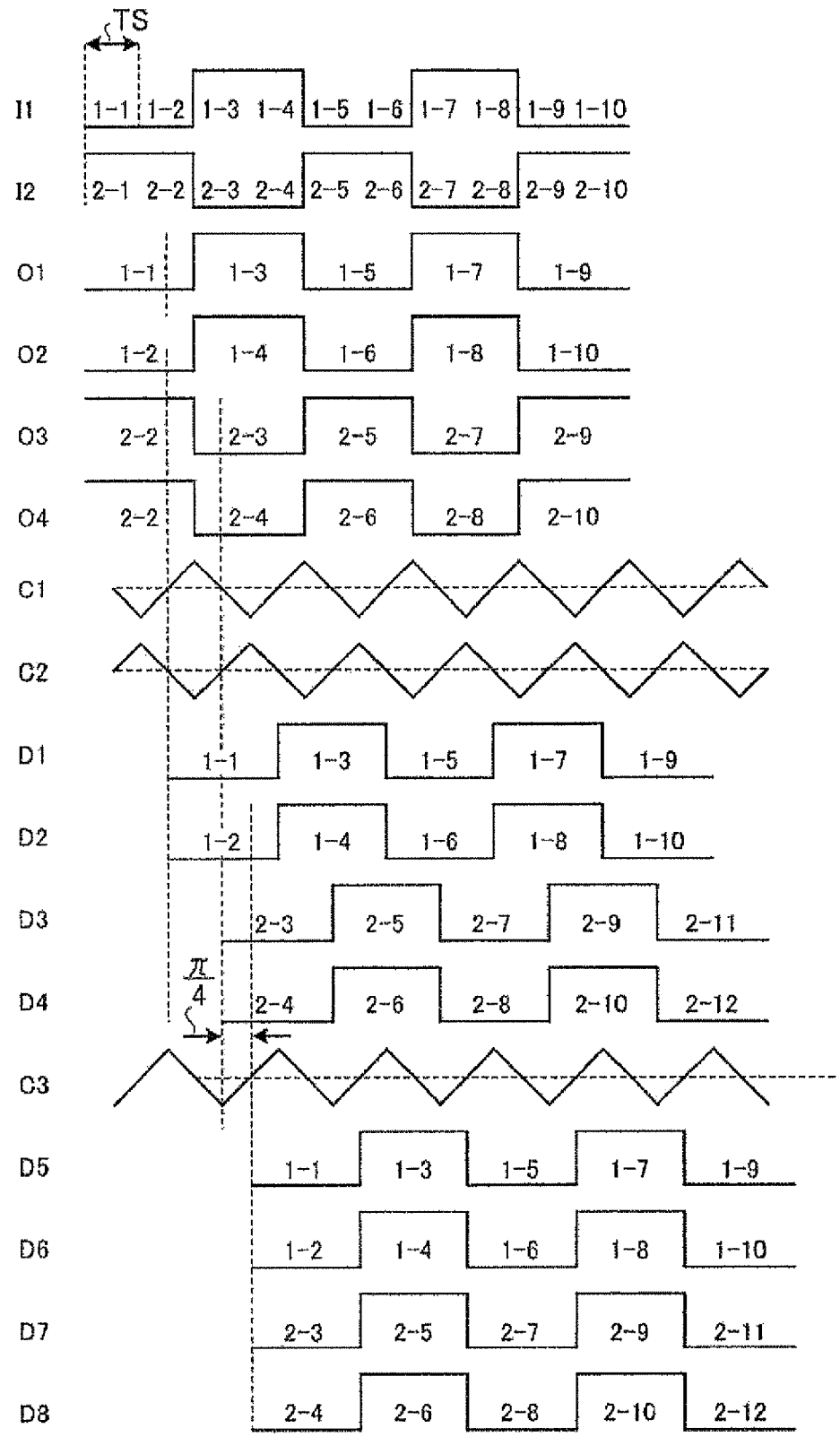
FIG. 3 is a drawing illustrating a timing chart for the case of setting output from the inversion circuit to the inverse clock signal and inputting a test pattern.
Figure 4:
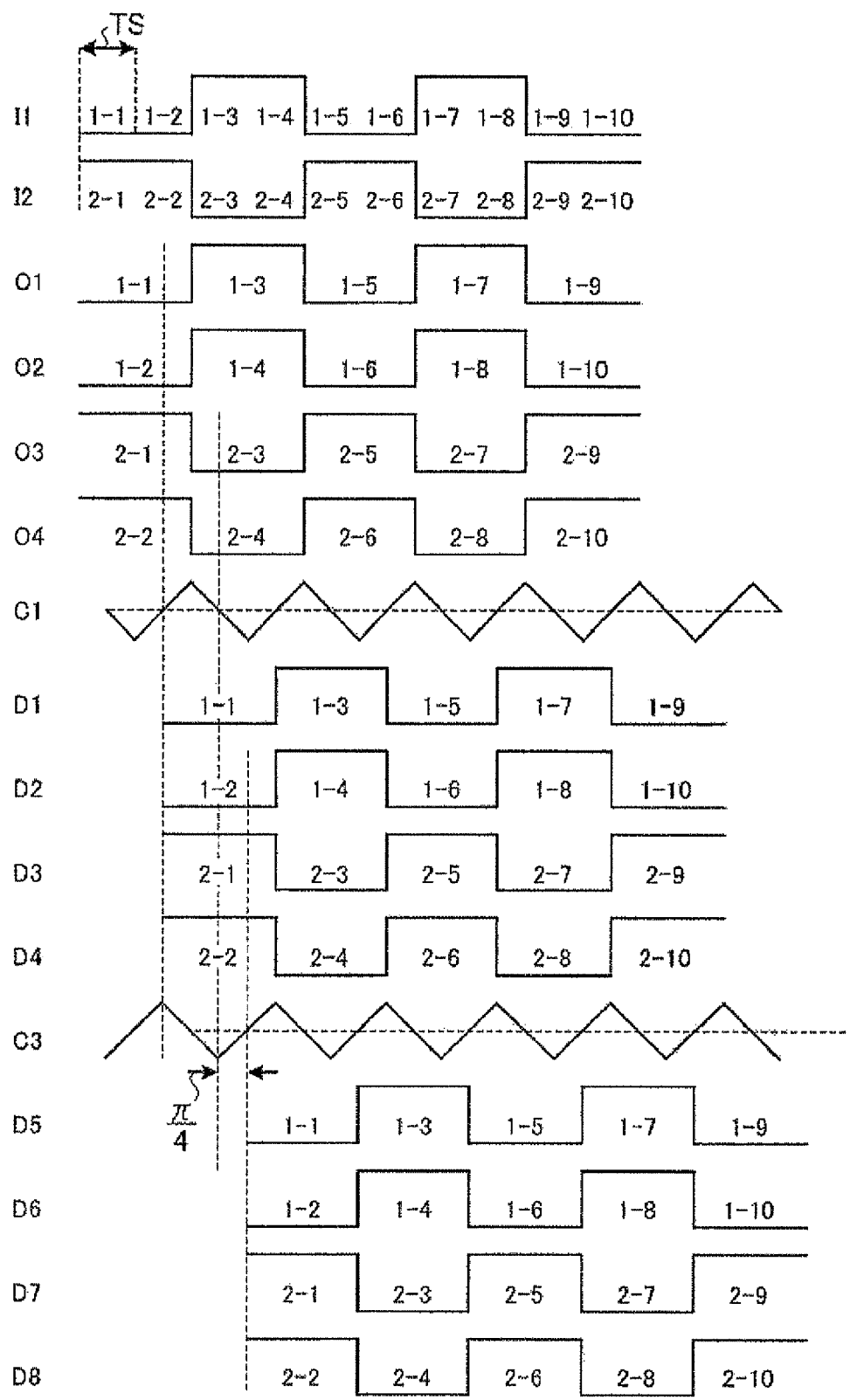
FIG. 4 is a drawing illustrating a timing chart for the case of setting output from the inversion circuit to the clock signal and inputting a test pattern.
Figure 5:
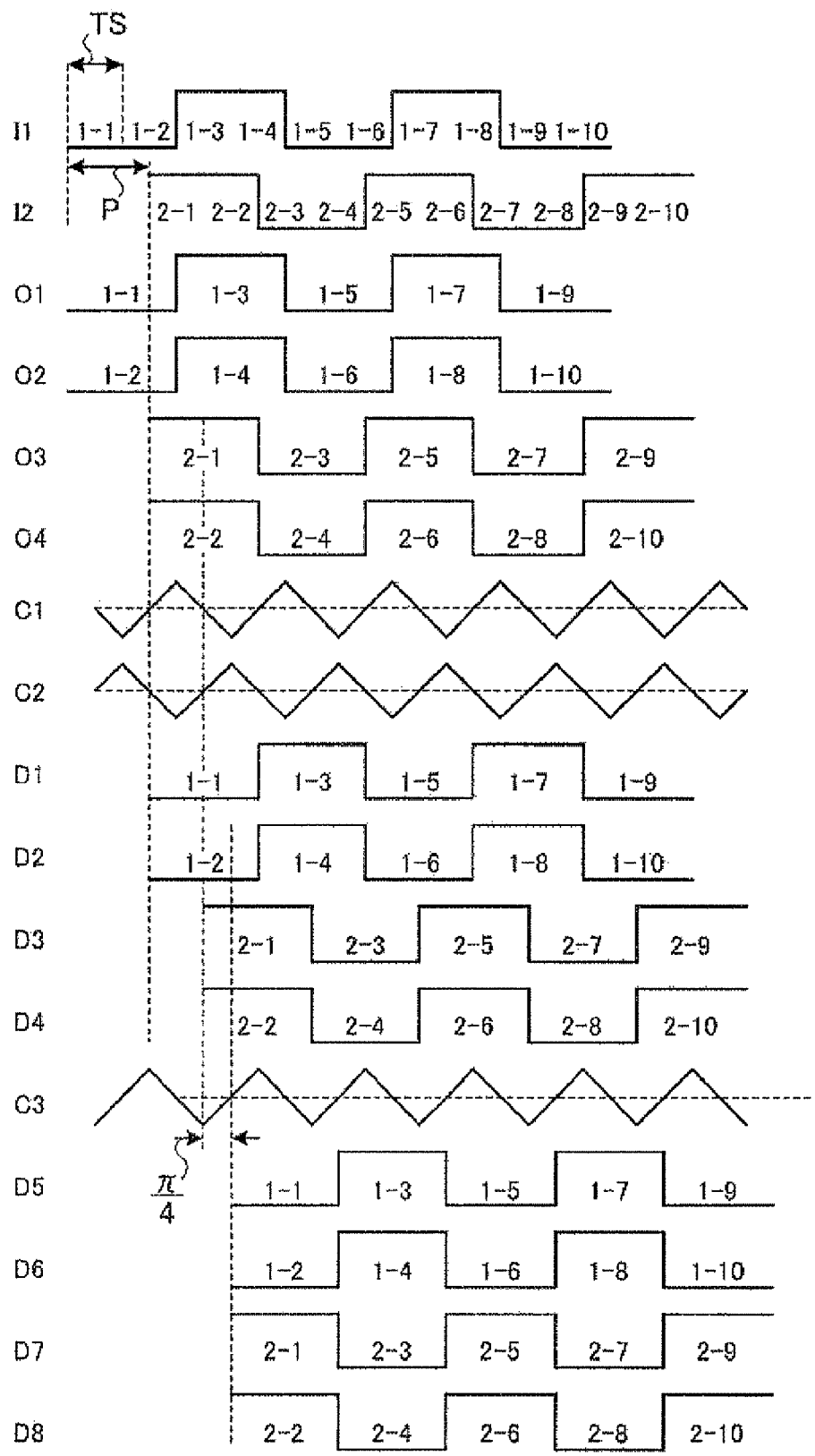
FIG. 5 is a drawing illustrating a timing chart for the case of setting output from the inversion circuit to the inverse clock signal and inputting a test pattern.

FIG. 3 and FIG. 5 are drawings illustrating timing charts for the case of setting output of the inversion circuit 33 to the inverted clock signal C2 and inputting the test pattern. FIG. 4 is drawing illustrating a timing chart for the case of setting the output from the inversion circuit 33 to the clock signal C1 and inputting the test pattern.

The timing chart of FIG. 3 will be explained. The transmission rate of the input data signals is 20 Gb/s, and the time slot TS is 50 ps. The phase difference between the two input data signals (the first data signal I1 and the second data signal I2) is 0 ps. Moreover, the inversion function of the inversion circuit 33 is set to ON. That is to say, the inverted clock signal C2 is output from the inversion circuit 33.

Firstly, the first data signal I1 is demultiplexed into the signal O1 and the signal O2 using the 10 GHz clock signal, and the second data signal I2 is demultiplexed into the signal O3 and the signal O4 using the 10 GHz clock signal.

Thereafter, the signal O1 and the signal O2 are latched at the rising edge timing of the clock signal C1, and the signal D1 and the signal D2 are output. At this time, the clock signal C1 is delayed by π/4 relative to the optimum decision phase of the signal O1.

Meanwhile, the signal O3 and the signal O4 are latched at the rising edge timing of the inverted clock signal C2, and the signal D3 and the signal 94 are output. At this time, the phase difference between the signal D1 and the signal D2 versus the signal D3 and the signal D4 is adjusted to 50 ps, which is equivalent to 1 time slot. That is to say, the resultant phase difference at this time is 50 ps.

Thereafter, the signal D1, the signal D2, the signal D3, and the signal D4 are latched at the rising edge timing of the delayed clock signal C3; and the signal D5, the signal D6, the signal D7, and the signal D8 are output. Here the delayed clock signal C3 is delayed by π/4 more than the clock signal C1. At this time, the resultant phase difference between the signal D5 and the signal D6 versus the signal 97 and the signal D8 becomes 100 ps, which is equivalent to 2 time slots. Due to the resultant phase difference of 100 ps, output logic of the signal D5—signal D8 (ON/OFF state of the waveforms) matches. That is to say, the ON/OFF setting of the inversion function of the inversion circuit 33 is considered to be erroneous in this case.

Thus when this type of output state is detected, a control signal S is generated by the control circuit 39 to turn OFF the inversion function of the inversion circuit 33, and this is sent to the inversion circuit 33. By this means, the inversion function of the inversion circuit 33 is turned OFF, and the inversion circuit 33 then outputs the clock signal C1 without modification.

The timing chart of FIG. 4 will be explained. The transmission rate of the input data signals is 20 Gb/s, and the time slot TS is 50 ps. The phase difference between the two input data signals (the first data signal I1 and the second data signal I2) is 0 ps. Also the inversion function of the inversion circuit 33 is turned OFF. That is to say, the clock signal C1 is output from the inversion circuit 33.

Firstly, the first data signal I1 is demultiplexed into the signal O1 and the signal O2 using the 10 GHz clock signal, and the second data signal I2 is demultiplexed into the signal O3 and the signal O4 using the 10 GHz clock signal.

Thereafter, the signal O1, the signal O2, the signal O3, and the signal O4 are latched at the rising edge timing of the clock signal C1, and the signal D1, the signal D2, the signal D3, and the signal D4 are output. The clock signal C1 here is delayed by π/4 relative to the optimum decision phase of the signal O1. A phase difference is not generated at this time.

Thereafter, the signal D1, the signal D2, the signal D3, and the signal D4 are latched at the rising edge timing of the delayed clock signal C3, and the signal D5, the signal D6, the signal D7, and the signal D8 are output. The clock signal C3 here is delayed by π/4 more than the clock signal C1. A phase difference is not generated at this time. Since a phase difference was not generated, the output logic of the signal D5—signal D8 is divergent. That is to say, the ON/OFF setting of the inversion function of the inversion circuit 33 is considered to be correct in this case.

Thus when this type of output state is detected, the control circuit 39 does not generate the control signal S and does not send the control signal S to the inversion circuit 33. By this means, the inversion function of the inversion circuit 33 is maintained at OFF, and the resultant output of the inversion circuit 33 is the unmodified clock signal C1.

The timing chart of FIG. 5 will be explained. The transmission rate of the input data signals is 20 Gb/s, and the time slot TS is 50 ps. The phase difference between the two input data signals (the first data signal I1 and the second data signal I2) is 75 ps, which is equivalent to 1.5 time slots. Also the inversion function of the inversion circuit 33 is turned ON. That is to say, the inverted clock signal C2 is output from the inversion circuit 33.

Firstly, the first data signal I1 is demultiplexed into the signal O1 and the signal O2 using the 10 GHz clock signal, and the second data signal I2 is demultiplexed into the signal O3 and the signal O4 using the 10 GHz clock signal. At this time, the 75 ps phase difference still exists between the signal O1 and the signal O2 versus the signal O3 and the signal O4.

Thereafter, the signal O1 and the signal O2 are latched at the rising edge timing of the clock signal C1, and the signal D1 and the signal D2 are output. The clock signal C1 here is delayed by π/4 relative to the optimum decision phase of the signal O1.

Meanwhile, the signal O3 and the signal O4 are latched at the rising edge timing of the inverted clock signal C2, and the signal D3 and the signal 94 are output. At this time, the phase difference between the signal D1 and the signal D2 versus the signal D3 and the signal D4 is adjusted to 50 ps, which is equivalent to 1 time slot. That is to say, 25 ps of the phase difference becomes canceled at this time.

Thereafter, the signal D1, the signal D2, the signal D3, and the signal D4 are latched at the rising edge timing of the delayed clock signal C3; and the signal D5, the signal D6, the signal D7, and the signal D8 are output. Here the delayed clock signal C3 is delayed by π/4 more than the clock signal C1. At this time, the resultant phase difference between the signal D5 and the signal D6 versus the signal D7 and the signal D8 is eliminated. That is to say, according to the optical receiver 1 of the present embodiment, the phase difference of 75 ps (equivalent to 1.5 time slots) arising between the two input data signals becomes eliminated. Due to the elimination of 75 ps of the phase difference, output logic of the signal D5—signal D8 is divergent. That is to say, the ON/OFF setting of the inversion function of the inversion circuit 33 is considered to be correct in this case.

Thus when this type of output state is detected, the control circuit 39 does not generate the control signal S and does not send the control signal S to the inversion circuit 33. By this means, the inversion function of the inversion circuit 33 is maintained ON, resulting in the inversion circuit 33 inverting the clock signal C1 and outputting the inverted clock signal C2.

In the above-described manner, the optical receiver 1 of the present embodiment causes output of the inverted clock signal C2 from the inversion circuit 33, and thus it becomes possible to reduce the phase difference at the time of input between the signals O1 and O2 output from the decision circuit 32 versus the signals O3 and O4 output from the decision circuit 34 by just 0-1 time slots. Furthermore, since the respective output signals are output through the decision circuits 36 and 37, further decrease of the phase differences by 1 time slot becomes possible. Meanwhile, due to output of the clock signal from the inversion circuit 33, it becomes possible to reduce the phase difference at the time of input by just 0-1 time slots. Thus at the time of initial adjustment of the circuit, in response to output results due to a test pattern, the signal output from the inversion circuit 33 is set to either the inverted clock signal C2 or the clock signal C1, and thus it becomes possible to adjust the phase difference to 0 from a maximum of two time slots.

Furthermore, although the optical receiver I of the above-mentioned embodiments was provided with the output detection circuit 38 and the control circuit 39, such components are not required. When such components are omitted, the designer may chose the ON/OFF setting of the inversion circuit 33 based on output results due to input of the test pattern. Circuit structure can be further simplified by this means. Furthermore, shortening of adjustment operation time becomes possible by providing the output detection circuit 38 and the control circuit 39.

Moreover, it is permissible to further provide as a next stage for the signal receiver 3 of the optical receiver 1, for example, a multiplexer (CRUX). In this case, a deserializer, for example, can be provided at a back stage for the optical receiver 1. Moreover, the above-mentioned optical receiver 1 may be contained in one part of a deserializer. In this case, for example, a demultiplexer (DEMUX) or a deskew circuit can be provided as a back stage for the signal receiver 3, and a framer, for example, can be provided at a back stage of the digital serializer which includes the optical receiver 1.

According to the above-mentioned embodiments, due to output of the inverted clock signal by the inverter, the phase difference between the two signals output by the first decision circuit versus the two signals output by the third decision circuit can be reduced by just 0-1 time slots relative to the phase difference at the time of input. Also due to use of the delayed clock signal to latch the respective output signals by the second decision circuit and the fourth decision circuit, respectively, it becomes possible to further reduce the phase difference by 1 time slot. Meanwhile, due to output of the clock signal by the inverter, reduction of the phase difference by just 0-1 time slots becomes possible relative to the phase difference at the time of input. Thus at the time of initial adjustment of the circuit it becomes possible to adjust the phase difference to 0 from a maximum of 2 time slots just by setting the signal output from the inverter to either the inverted clock signal or the clock signal.

The many features and advantages of the embodiments are apparent from the detailed specification and, thus, it is intended by the appended claims to cover all such features and advantages of the embodiments that fall within the true spirit and scope thereof Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An optical receiver comprising:
 an optical front end receiving an optical signal modulated by differential phase shift keying and converting the received optical signal to electrical first and second data signals corresponding to differential phase shift keying signals including an in-phase and a quadrature phase;
 a clock regenerator regenerating a clock signal from the first data signal;
 a first demultiplexer demultiplexing the first data signal into two signals;
 a first decision circuit outputting the two signals demultiplexed by the first demultiplexer using the clock signal;
 a delay member outputting a delayed clock signal produced by delaying the clock signal;
 a second decision circuit outputting the two signals demultiplexed by the first demultiplexer using the delayed clock signal;
 a second demultiplexer demultiplexing the second data signal into two signals;
 an inverter generating an inverted clock signal by inverting the clock signal and outputting either the inverted clock signal or the clock signal;

a third decision circuit outputting the two signals demultiplexed by the second demultiplexer using the inverted clock signal or the clock signal, respectively; and a fourth decision circuit respectively outputting the two signals output by the third decision circuit using the delayed clock signal.

2. The optical receiver according to claim 1; wherein amount of the certain delay is $\pi/4$ or is substantially equivalent to $\pi/4$.

3. The optical receiver according to claim 1;

wherein the optical receiver further comprises a controller generating and outputting a control signal causing output of either the inverted clock signal or the clock signal; and the inverter outputs either the inverted clock signal or the clock signal according to the control signal output by the controller.

4. The optical receiver according to claim 1;

wherein the controller generates the control signal based on the two signals output by the second decision circuit and the two signals output by the fourth decision circuit.

5. A control method of an optical receiver for receiving an optical signal modulated by differential phase shift keying; wherein the optical receiver comprises:

a conversion operation receiving the optical signal and converting the received optical signal into a first data signal and a second data signal corresponding to an in-phase and a quadrature phase;

a regeneration operation regenerating a clock signal from the first data signal;

a first demultiplexing operation demultiplexing the first data signal into two signals;

a first decision operation using the clock signal for respective outputting of the two demultiplexed signals of the first demultiplexing operation;

a delay operation outputting a delayed clock signal produced by delaying the clock signal by a certain delay amount;

a second decision operation using the delayed clock signal for respective outputting of the two demultiplexed signals of the first demultiplexing operation;

a second demultiplexing operation demultiplexing the second data signal into two signals;

an inversion operation generating an inverted clock signal by inversion of the clock signal and outputting either the inverted clock signal or the clock signal;

a third decision operation using the inverted clock signal or the clock signal output during the inversion operation for respective outputting of the two demultiplexed signals of the second demultiplexing operation; and a fourth decision operation using the delayed clock signal for respective outputting of the two signals output during the third decision operation.

6. The control method for the optical receiver according to claim 5; wherein amount of the certain delay is $\pi/4$ or is substantially equivalent to $\pi/4$.

7. The control method for the optical receiver according to claim 5; wherein the optical receiver further comprises:

a control operation generating and outputting a control signal for causing output of either the inverted clock signal or the clock signal; and the inversion operation outputs either the inverted clock signal or the clock signal according to the control signal output during the control operation.

8. The control method for the optical receiver according to claim 7;

wherein the control operation generates the control signal based on the two signals output by the second decision operation and the two signals output by the fourth decision operation.

9. A method comprising:

converting an optical signal modulated by differential phase shift keying to electrical first and second data signals corresponding to an in-phase and a quadrature phase;

generating a clock signal from the first data signal;

demultiplexing the first data signal into two signals;

latching the two signals using the clock signal;

delaying the clock signal by a certain amount;

latching the two signals using the delayed clock signal;

demultiplexing the second data signal into two additional signals;

generating an inverted clock signal by inverting the clock signal;

latching the two additional signals using the inverted clock signal or the clock signal; and further latching the two additional signals using the delayed clock signal.

10. An optical receiver comprising:

an optical front end converting an optical signal modulated by differential phase shift keying to electrical first and second data signals corresponding to an in-phase and a quadrature phase;

a clock regenerator generating a clock signal from the first data signal;

a first demultiplexer demultiplexing the first data signal into two signals;

a first latching circuit latching the two signals using the clock signal;

a delaying member delaying the clock signal by a certain amount;

a second latching circuit latching the two signals using the delayed clock signal;

a second demultiplexer demultiplexing the second data signal into two additional signals;

a inverter generating an inverted clock signal by inverting the clock signal;

a third latching circuit latching the two additional signals using the inverted clock signal or the clock signal; and a forth latching circuit further latching the two additional signals using the delayed clock signal.

* * * * *